US012522726B2

(12) United States Patent
Ko et al.

(10) Patent No.: US 12,522,726 B2
(45) Date of Patent: Jan. 13, 2026

(54) COMPOSITE RESIN COMPOSITION FOR AUTOMOBILE INTERIOR MATERIALS AND AUTOMOBILE INTERIOR MATERIAL MANUFACTURED USING THE SAME

(71) Applicant: LG CHEM, LTD., Seoul (KR)

(72) Inventors: Gun Ko, Daejeon (KR); Jae Hong Lee, Daejeon (KR); Sun Mo Son, Daejeon (KR); Seonho Kong, Daejeon (KR)

(73) Assignee: LG CHEM, LTD., Seoul (KR)

( * ) Notice: Subject to any disclaimer, the term of this patent is extended or adjusted under 35 U.S.C. 154(b) by 388 days.

(21) Appl. No.: 17/909,710

(22) PCT Filed: Feb. 25, 2022

(86) PCT No.: PCT/KR2022/002754
§ 371 (c)(1),
(2) Date: Apr. 25, 2024

(87) PCT Pub. No.: WO2022/225164
PCT Pub. Date: Oct. 27, 2022

(65) Prior Publication Data
US 2025/0188271 A1    Jun. 12, 2025

(30) Foreign Application Priority Data

Apr. 23, 2021 (KR) .................. 10-2021-0052721
Feb. 24, 2022 (KR) .................. 10-2022-0024263

(51) Int. Cl.
| | | |
|---|---|---|
| C08L 69/00 | (2006.01) | |
| B29C 48/00 | (2019.01) | |
| B29K 33/00 | (2006.01) | |
| B29K 63/00 | (2006.01) | |
| B29K 67/00 | (2006.01) | |
| B29K 69/00 | (2006.01) | |
| B29K 83/00 | (2006.01) | |
| B29K 105/00 | (2006.01) | |
| B29L 31/30 | (2006.01) | |
| C08K 5/092 | (2006.01) | |
| C08K 5/10 | (2006.01) | |
| C08K 5/12 | (2006.01) | |

(52) U.S. Cl.
CPC ............ C08L 69/00 (2013.01); B29C 48/022 (2019.02); C08K 5/092 (2013.01); C08K 5/10 (2013.01); C08K 5/12 (2013.01); B29K 2033/08 (2013.01); B29K 2063/00 (2013.01); B29K 2067/003 (2013.01); B29K 2067/006 (2013.01); B29K 2069/00 (2013.01); B29K 2083/00 (2013.01); B29K 2105/0044 (2013.01); B29K 2105/0085 (2013.01); B29K 2105/0088 (2013.01); B29K 2105/0094 (2013.01); B29K 2995/0016 (2013.01); B29K 2995/0089 (2013.01); B29K 2995/0094 (2013.01); B29L 2031/3005 (2013.01); C08L 2205/035 (2013.01)

(58) Field of Classification Search
CPC .......... C08L 69/00; C08L 67/02; C08L 83/10; C08L 51/04; C08L 63/00; C08K 5/11
See application file for complete search history.

(56) References Cited

U.S. PATENT DOCUMENTS

| | | | | |
|---|---|---|---|---|
| 5,371,142 A | * | 12/1994 | Nishikubo | ............... C08L 67/02 525/148 |
| 6,197,873 B1 | * | 3/2001 | Miyata | .................... C08L 69/00 524/505 |
| 8,304,495 B1 | | 11/2012 | Fan | |
| 11,180,652 B2 | | 11/2021 | Kim et al. | |
| 2005/0113534 A1 | * | 5/2005 | Agarwal | ................. C08L 69/00 525/439 |
| 2006/0074202 A1 | * | 4/2006 | Juikar | .................... C08K 5/353 525/439 |
| 2006/0264579 A1 | * | 11/2006 | Ellington | ................ C08L 55/02 525/438 |
| 2007/0179246 A1 | | 8/2007 | Fan | |
| 2008/0015290 A1 | * | 1/2008 | Siripurapu | .............. C08L 69/00 524/115 |
| 2008/0211135 A1 | * | 9/2008 | Eipper | .................... C08L 67/02 264/225 |
| 2008/0242784 A1 | * | 10/2008 | Ganesan | ................. C08L 67/02 524/427 |
| 2012/0289655 A1 | * | 11/2012 | Sumita | ................ B29C 45/0001 525/175 |
| 2013/0190425 A1 | * | 7/2013 | Zhu | ......................... C08L 69/00 523/451 |
| 2014/0031457 A1 | * | 1/2014 | Alidedeoglu | ........... C08L 67/06 524/537 |

(Continued)

FOREIGN PATENT DOCUMENTS

| | | |
|---|---|---|
| CN | 105566879 | 5/2016 |
| CN | 110139899 | 8/2019 |
| CN | 111492011 | 8/2020 |
| EP | 2635635 B1 | 11/2010 |
| EP | 2635636 B1 | 11/2010 |
| EP | 2738204 B1 | 11/2013 |
| JP | H08176427 A | 7/1996 |
| JP | H11152398 A | 6/1999 |
| JP | 2000103953 A | 4/2000 |
| JP | 2002105300 A | 4/2002 |
| JP | 2010195923 A | 9/2010 |
| JP | 2014001374 A | 1/2014 |
| JP | 6864946 B2 | 4/2021 |
| KR | 10-2003-0000778 A | 1/2003 |

(Continued)

*Primary Examiner* — Jeffrey M Wollschlager
(74) *Attorney, Agent, or Firm* — BRYAN CAVE LEIGHTON PAISNER LLP

(57) ABSTRACT

A composite resin composition for automobile interior products and an automobile interior product manufactured using the same are disclosed. More particularly, raw materials included in the composite resin composition for automobile interior products are optimized so that heat resistance and hydrolysis resistance stability are improved. Accordingly, the balance between physical properties such as mechanical properties and fluidity is satisfied and excellent product reliability and appearance can be provided.

18 Claims, No Drawings

(56) References Cited

U.S. PATENT DOCUMENTS

| | | | | |
|---|---|---|---|---|
| 2015/0353732 A1* | 12/2015 | Wang | ................ | C08L 67/02 |
| | | | | 524/588 |
| 2018/0187005 A1* | 7/2018 | Kim | ................ | C08L 69/00 |
| 2019/0203042 A1* | 7/2019 | Park | ................ | C08L 23/08 |
| 2021/0054193 A1 | 2/2021 | Kim et al. | | |
| 2021/0222002 A1* | 7/2021 | Liu | ................ | C08L 69/00 |
| 2021/0253789 A1* | 8/2021 | Kitagawa | ................ | C08L 23/04 |
| 2022/0041860 A1* | 2/2022 | Wang | ................ | C08L 51/06 |
| 2023/0416525 A1* | 12/2023 | Liu | ................ | C08G 64/10 |

FOREIGN PATENT DOCUMENTS

| | | |
|---|---|---|
| KR | 10-07589370000 B1 | 9/2007 |
| KR | 10-2008-0094807 A | 10/2008 |
| KR | 10-2014-0070455 A | 6/2014 |
| KR | 10-2017-0111792 A | 10/2017 |
| KR | 10-2018-0078908 A | 7/2018 |
| KR | 10-1958884 | 3/2019 |
| KR | 10-19588840000 B1 | 3/2019 |
| KR | 10-20410100000 B1 | 10/2019 |
| KR | 10-20671180000 B1 | 1/2020 |
| KR | 10-2020-0060928 A | 6/2020 |
| KR | 10-21971590000 B1 | 12/2020 |
| KR | 10-2021-0001616 A | 1/2021 |
| WO | 2020203436 A | 10/2020 |
| WO | 2020263015 A1 | 12/2020 |

* cited by examiner

COMPOSITE RESIN COMPOSITION FOR AUTOMOBILE INTERIOR MATERIALS AND AUTOMOBILE INTERIOR MATERIAL MANUFACTURED USING THE SAME

CROSS-REFERENCE TO RELATED APPLICATIONS

The present application is a National Phase entry pursuant to 35 U.S.C. § 371 of International Application No. PCT/KR2022/002754, filed Feb. 25, 2022, and claims priority to and the benefit of Korean Patent Application No. 10-2021-0052721, filed on Apr. 23, 2021, and Korean Patent Application No. 10-2022-0024263, filed on Feb. 24, 2022, in the Korean Intellectual Property Office, the disclosures of each of which are incorporated herein by reference in their entirety.

FIELD

The present invention relates to a composite resin composition for automobile interior products and an automobile interior product manufactured using the same, and more particularly to a composite resin composition for automobile interior products, wherein raw materials included in the composite resin composition are optimized so that heat resistance and hydrolysis resistance stability are improved, whereby the balance between physical properties such as mechanical properties and fluidity is satisfied and excellent product reliability and appearance are provided; and an automobile interior product manufactured using the composite resin composition.

BACKGROUND

Conventional automobile interior product materials include an acrylonitrile-butadiene-styrene (ABS) resin, a composite resin prepared by mixing a polycarbonate (PC) resin with an acrylonitrile-butadiene-styrene (ABS) resin, a composite resin prepared by mixing a polycarbonate (PC) resin with acrylate-styrene-acrylonitrile (ASA) resin, a composite resin prepared by mixing a polycarbonate (PC) resin with a polybutylene terephthalate (PBT) resin, and the like. These materials have excellent physical properties, thus being used in various automobile interior components.

However, the materials may cause hydrolysis in a high-temperature and high-humidity environment to deteriorate physical properties. In particular, when a polycarbonate (PC) resin is mixed with a polybutylene terephthalate (PBT) resin, physical properties are decreased due to transesterification reaction. Accordingly, it is necessary to appropriately control the reaction.

Therefore, it is necessary to develop an automobile interior product material that can satisfy physical properties, such as mechanical properties and heat resistance, without causing hydrolysis in a dry environment, especially in a high-temperature and high-humidity environment.

Patent Document

Korean Patent Application Publication No. 2018-0078908 (published on Jul. 10, 2018)

SUMMARY

Therefore, the present invention has been made in view of the above problems, and it is one object of the present invention to provide a composite resin composition for automobile interior products, wherein the composite resin composition includes optimal materials so that production cost can be reduced and the composite resin composition can be used for an unpainted product, thereby providing superior economic feasibility. In addition, heat resistance and hydrolysis resistance stability can be improved, the balance between physical properties such as mechanical properties and fluidity is satisfied, and excellent product reliability and appearance are provided.

It is another object of the present invention to provide an automobile interior product manufactured using the composite resin composition for automobile interior products.

The above and other objects can be accomplished by the present disclosure described below.

In accordance with an aspect of the present invention, the above and other objects can be accomplished by the provision of a composite resin composition for automobile interior products, including:

100 parts by weight of the composite resin comprising 60 to 79% by weight of a polycarbonate resin, 20 to 30% by weight of a polybutylene terephthalate resin and 1 to 10% by weight of a polyethylene terephthalate resin; and 10 to 40 parts by weight of a hydrolysis stabilizer prepared by mixing 20 to 50% by weight of a polyorganosiloxane-polycarbonate resin, 48.5 to 65% by weight of a (meth)acrylate compound-conjugated diene compound-aromatic vinyl compound copolymer, 0.1 to 10% by weight of a dialkyl phthalate compound and 0.1 to 10% by weight of a carboxy-reactive epoxy resin.

The polyethylene terephthalate resin may include 1 to 5% by weight of a crystallization rate reducing agent based on a total weight of the polyethylene terephthalate resin comprising the crystallization rate reducing agent.

The crystallization rate reducing agent may be one or more selected from the group consisting of isophthalic acid, cyclohexylene dimethanol, diethylene glycol and neopentyl glycol.

The polybutylene terephthalate resin may have an intrinsic viscosity of 0.9 dl/g or more, and the polyethylene terephthalate resin may have an intrinsic viscosity of 0.6 to 0.9 dl/g.

The polycarbonate resin may have a flow index (300° C., load: 1.2 kg) of 5 to 12 g/10 min.

The polyorganosiloxane-polycarbonate resin may include a diorganosiloxane-derived block in an amount of 5 to 30% by weight (calculated by a weight of diorganosiloxane compound) of the polyorganosiloxane-polycarbonate resin.

The (meth)acrylate compound-conjugated diene compound-aromatic vinyl compound copolymer may include 40 to 80% by weight of a conjugated diene compound, 10 to 40% by weight of an aromatic vinyl compound, and 1 to 20% by weight of a (meth)acrylate compound.

A particle size of the (meth)acrylate compound-conjugated diene compound-aromatic vinyl compound copolymer may be 0.2 to 0.4 μm.

The dialkyl phthalate compound may have an alkyl group having 5 to 8 carbon atoms.

The carboxy-reactive epoxy resin may be one or more selected from among an ethylene-n-butyl acrylate-glycidyl methacrylate copolymer, an ethylene-glycidyl methacrylate copolymer, an ethylene-acrylic ester-glycidyl methacrylate copolymer, an ethylene-methyl acrylate-glycidyl methacrylate copolymer, an ethylene-dimethacrylate-glycidyl methacrylate copolymer, an ethylene-acrylate-glycidyl methacrylate copolymer and an ethylene-vinyl acetate-glycidyl methacrylate copolymer.

The carboxy-reactive epoxy resin may include 1 to 15% by weight of a glycidyl methacrylate-derived unit.

An intrinsic viscosity of the polybutylene terephthalate resin may be higher than an intrinsic viscosity of the polyethylene terephthalate resin.

The polyethylene terephthalate resin may have a melting point of 252° C. or less.

A high-load heat resistance, measured under 1.82 MPa according to ISO 75, of the composite resin composition may be 92° C. or more.

A hydrolysis-resistance retention rate, which is represented by Equation 1 below, of the composite resin composition may be 79% or more:

hydrolysis-resistance retention rate=(Izod impact strength after aging/Izod impact strength before aging)×100    [Equation 1]

where aging is performed for 168 hr in a chamber under conditions of 85° C. and 85%, and Izod impact strength is a notch impact strength measured at 23° C. according to ISO 180/1A.

In accordance with another aspect of the present invention, there is provided a composite resin composition, including:

100 parts by weight of the composite resin comprising 60 to 79% by weight of a polycarbonate resin, 20 to 30% by weight of a polybutylene terephthalate resin and 1 to 10% by weight of a polyethylene terephthalate resin; and 10 to 40 parts by weight of a hydrolysis stabilizer prepared by mixing 20 to 50% by weight of a polyorganosiloxane-polycarbonate resin, 48.5 to 65% by weight of a (meth)acrylate compound-conjugated diene compound-aromatic vinyl compound copolymer, 0.1 to 10% by weight of a dialkyl phthalate compound and 0.1 to 10% by weight of a carboxy-reactive epoxy resin, wherein an intrinsic viscosity of the polybutylene terephthalate resin is higher than an intrinsic viscosity of the polyethylene terephthalate resin, and a melting point of the polyethylene terephthalate resin is 252° C. or less.

In accordance with still another aspect of the present invention, there is provided a method of preparing a composite resin composition, the method comprising: a step of feeding 100 parts by weight of the composite resin comprising 60 to 79% by weight of a polycarbonate resin, 10 to 30% by weight of a polybutylene terephthalate resin and 1 to 10% by weight of a polyethylene terephthalate resin; and 10 to 40 parts by weight of a hydrolysis stabilizer prepared by mixing 20 to 50% by weight of a polyorganosiloxane-polycarbonate resin, 48.5 to 65% by weight of a (meth)acrylate compound-conjugated diene compound-aromatic vinyl compound copolymer, 0.1 to 10% by weight of a dialkyl phthalate compound and 0.1 to 10% by weight of a carboxy-reactive epoxy resin into an extruder, followed by melt-kneading and extruding.

The step of melt-kneading and extruding the composite resin composition may be performed under conditions of 250 to 300° C., an F/R (flow ratio) of 55 to 95 kg/hr, and a screw rotation number of 150 to 600 rpm.

After extruding the composite resin composition, a step of injecting the composite resin composition at an injection temperature of 260 to 280° C. and a mold temperature of 40 to 80° C. may be further performed.

In accordance with still another aspect of the present invention, there is provided a method of preparing a composite resin composition, the method comprising:

a step of feeding 100 parts by weight of the composite resin comprising 60 to 79% by weight of a polycarbonate resin, 10 to 30% by weight of a polybutylene terephthalate resin and 1 to 10% by weight of a polyethylene terephthalate resin; and 10 to 40 parts by weight of a hydrolysis stabilizer prepared by mixing 20 to 50% by weight of a polyorganosiloxane-polycarbonate resin, 48.5 to 65% by weight of a (meth)acrylate compound-conjugated diene compound-aromatic vinyl compound copolymer, 0.1 to 10% by weight of a dialkyl phthalate compound and 0.1 to 10% by weight of a carboxy-reactive epoxy resin into an extruder, followed by melt-kneading and extruding, wherein an intrinsic viscosity of the polybutylene terephthalate resin is higher than an intrinsic viscosity of the polyethylene terephthalate resin, and the polyethylene terephthalate resin has a melting point of 252° C. or less.

In accordance with yet another aspect of the present invention, there is provided an automobile interior product manufactured using the composite resin composition.

The automobile interior product may include a floor console front tray, a cup holder, an inner garnish, a switch bezel, a cup holder housing, or an indicator panel.

A composite resin composition for automobile interior products according to the present invention includes a composite resin comprising a polycarbonate resin, a polybutylene terephthalate resin and a polyethylene terephthalate resin in specific % by weight; and a hydrolysis stabilizer prepared by mixing a polyorganosiloxane-polycarbonate resin, a (meth)acrylate compound-conjugated diene compound-aromatic vinyl compound copolymer, a dialkyl phthalate compound and a carboxy-reactive epoxy resin in specific % by weight and can be used to mold an automobile interior product.

In addition, an automobile interior product manufactured using the composition has improved heat resistance and hydrolysis resistance stability, thus satisfying the balance between physical properties such as mechanical properties and fluidity and providing improved appearance due to excellent moldability.

Therefore, the composite resin composition for automobile interior products according to the present invention and a molded article manufactured using the same can be applied to automobile interior products such as a floor console front tray, a cup holder, an inner garnish, a switch bezel, a cup holder housing, and an indicator panel.

DETAILED DESCRIPTION

Hereinafter, the present invention will be described in more detail to help the understanding of the present invention.

The terms or words used in the present specification and claims should not be construed as being limited to conventional or dictionary meanings, and considering that inventors can appropriately define the concept of a term to describe the invention in the best way, it should be interpreted as a meaning and concept consistent with the technical idea of the present invention.

In the present disclosure, "comprising" may be defined as "polymerized comprising" or "comprising as a unit derived . . . ," unless otherwise defined.

Unless otherwise specified, all numbers, values, and/or expressions expressing the quantities of ingredients, reaction conditions, polymer compositions and formulations used in the present disclosure are approximations reflecting various uncertainties due to measurements conducted to obtain the values from essentially different values. Accordingly, it should be understood as being modified by the term "about" in all cases. Also, when numerical ranges are disclosed in the present disclosure, such ranges are continuous and include all values from the minimum values to the maximum values of the ranges, unless otherwise indicated. Furthermore, when such ranges refer to integers, all integers including from the minimum value to the maximum value are included, unless otherwise specified.

In the present disclosure, when a variable is expressed as a range, it will be understood that the variable includes all values within the range including the endpoints of the range. For example, it will be understood that a range from "5 to 10" includes the values of 5, 6, 7, 8, 9 and 10, as well as any subranges from 6 to 10, 7 to 10, 6 to 9, 7 to 9, etc. and any values between integers that fall within the scope of the recited range such as 5.5 to 8.5, and 6.5 to 9, and the like. Also, it will be understood that a range from 10 to 30% include values of 10%, 11%, 12%, 13%, etc. and all integers including up to 30%, as well as any values between valid integers within the range of stated ranges such as 10.5%, 15.5%, 25.5%, etc.

The term "hydrolysis stabilizer" used in the present disclosure refers to a substance that is added to improve hydrolysis resistance stability unless otherwise specified.

The present inventors have confirmed that an interior material for automobiles prepared using a composite resin composition comprising a composite resin including a polycarbonate resin, a polybutylene terephthalate resin and a polyethylene terephthalate resin in specific % by weight; and a hydrolysis stabilizer, prepared by mixing a polyorganosiloxane-polycarbonate resin, a (meth)acrylate compound-conjugated diene compound-aromatic vinyl compound copolymer, a dialkyl phthalate compound and a carboxy-reactive epoxy resin in specific % by weight exhibits improved heat resistance and hydrolysis resistance stability so that the balance between physical properties such as mechanical properties and fluidity is satisfied and excellent product reliability and appearance are provided. In addition, the present inventors have completed an interior product material for automobiles that has excellent moldability and appearance while satisfying the balance between physical properties such as mechanical properties and fluidity and does not need to be painted.

Composite Resin Composition

A composite resin composition according to an embodiment of the present invention includes 100 parts by weight of a composite resin comprising 60 to 79% by weight of a polycarbonate resin, 20 to 30% by weight of a polybutylene terephthalate resin and 1 to 10% by weight of a polyethylene terephthalate resin; and 10 to 40 parts by weight of a hydrolysis stabilizer prepared by mixing 20 to 50% by weight of a polyorganosiloxane-polycarbonate resin, 48.5 to 65% by weight of a (meth)acrylate compound-conjugated diene compound-aromatic vinyl compound copolymer, 0.1 to 10% by weight of a dialkyl phthalate compound, and 0.1 to 10% by weight of a carboxy-reactive epoxy resin.

When a polycarbonate resin according to an embodiment of the present invention is included in a composite resin composition, the composite resin composition may be imparted with hydrolysis resistance stability and heat resistance. An automobile interior product prepared using the composite resin composition provides improved mechanical properties and fluidity and improves the appearance of an injected product.

The polycarbonate resin may have a flow index (300° C., load: 1.2 kg) of 5 to 12 g/10 min or more, 8 to 12 g/10 min, or 9 to 11 g/10 min. When the flow index below the range, it is difficult to perform injection molding. When the flow index is too high, moldability, mechanical properties and chemical resistance are decreased, which may cause problems in the appearance of components.

In the present disclosure, the flow index may be a melt flow index measured under a load of 5 kg at 250° C. according to ISO 1133, unless otherwise specified.

The polycarbonate resin is not specifically limited and may be prepared and used by a method known in the art. Alternatively, a commercially available material may be used.

For example, the polycarbonate resin may be prepared by reacting a diphenol compound with a phosgene compound, a halogen acid ester compound, a carbonic acid ester compound or a combination thereof in the presence of a molecular weight regulator and a catalyst.

The diphenol compound may be, without being specifically limited to, 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-cyclohexane, 2,2-bis-(3-chloro-4-hydroxyphenyl)-propane, 2,2-bis-(3,5-dichloro-4-hydroxyphenyl)-propane, or the like. Preferably, the diphenol compound may be bisphenol A, 2,2-bis-(4-hydroxyphenyl)-propane.

The polycarbonate resin may be a homopolymer, a copolymer including two or more types of diphenol compounds, or a mixture thereof and may be a linear polycarbonate resin, a branched polycarbonate resin or a polyestercarbonate copolymer, preferably a linear polycarbonate resin. The linear polycarbonate resin refers to a resin excluding a crosslinking agent, unless otherwise specified. As a particular example, the linear polycarbonate resin may be a bisphenol A-based polycarbonate resin.

The amount of the polycarbonate resin may be 60 to 79% by weight based on 100% by weight of a total of the composite resin (polycarbonate resin+polybutylene terephthalate resin+polyethylene terephthalate resin). As a particular example, the amount of the polycarbonate resin may be 70 to 80% by weight, preferably 70 to 75% by weight. When the amount of the polycarbonate resin is less than this range, an automobile interior product prepared using a composite resin composition including the polycarbonate resin may be cracked. When the amount of the polycarbonate resin exceeds the range, the stiffness and heat resistance of an automobile interior product prepared using a composite resin composition including the polycarbonate resin are decreased.

That is, when the polycarbonate resin according to an embodiment of the present invention includes a polycarbonate resin in an amount of 60 to 79% by weight based on 100% by weight of a total of the composite resin, a composite resin composition is provided with moldability and thus an automobile interior product prepared using the composite resin composition may realize fluidity, mechanical strength, heat resistance, appearance.

The polybutylene terephthalate resin and polyethylene terephthalate resin according to an embodiment of the present invention are crystalline materials. A composite resin composition including the polybutylene terephthalate resin and the polyethylene terephthalate resin is imparted with moldability, and an automobile interior product prepared using the composite resin composition is imparted with chemical resistance.

The polybutylene terephthalate resin is a crystalline resin and thus prevents the penetration of chemicals introduced from the outside. When the polybutylene terephthalate resin is included in a composite resin composition, the flowability of the composite resin composition is improved during injection molding so that excellent appearance is provided.

The intrinsic viscosity of the polybutylene terephthalate resin may be 0.9 dl/g or more, or 1.0 to 1.3 dl/g. When the intrinsic viscosity is below this range, the effect of reinforcing physical properties is decreased so that the effect of improving chemical resistance is insignificant. When the intrinsic viscosity is too high, moldability is decreased so that problems in the appearance of components may occur.

In the present disclosure, when intrinsic viscosity is measured, unless noted otherwise, a sample to be measured is completely dissolved in a methylene chloride solvent at a concentration of 0.05 g/ml, and then is filtered using a filter to obtain a filtrate. Then, using the obtained filtrate, intrinsic viscosity is measured at 20° C. using a Ubbelohde viscometer.

The amount of the polybutylene terephthalate resin may be 20 to 30% by weight, 21 to 29% by weight as a particular example, preferably 21 to 28% by weight, based on 100% by weight of a total of the composite resin (polycarbonate resin+polybutylene terephthalate resin+polyethylene terephthalate resin). When the polybutylene terephthalate resin is included in an amount less than the range, an automobile interior product prepared using a composite resin composition including the polybutylene terephthalate resin may be cracked. When the polybutylene terephthalate resin is included in an amount greater than the range, the stiffness and heat resistance of an automobile interior product prepared using a composite resin composition including the polybutylene terephthalate resin are decreased.

The intrinsic viscosity of the polybutylene terephthalate resin may be greater than the intrinsic viscosity of the polyethylene terephthalate resin.

In the present disclosure, the intrinsic viscosity of the polyethylene terephthalate resin may be 0.6 to 0.9 dl/g, or 0.7 to 0.9 dl/g. When the intrinsic viscosity is below the range, the effect of reinforcing physical properties is decreased so that the effect of improving chemical resistance is insignificant. When the intrinsic viscosity is too high, moldability is decreased so that problems in the appearance of components may occur.

The polyethylene terephthalate resin may include a crystallization rate reducing agent.

The crystallization rate reducing agent may be one or more selected from the group consisting of isophthalic acid, cyclohexylene dimethanol, diethylene glycol and neopentyl glycol. Considering the reaction efficiency, isophthalic acid or cyclohexylene dimethanol is preferred.

In a step of preparing a polyethylene terephthalate resin, the crystallization rate reducing agent may be added together with raw materials including terephthalic acid and ethylene or after primarily reacting terephthalic acid with ethylene glycol.

Here, the amount of the crystallization rate reducing agent may be less than 20% by weight, particularly 1 to 5% by weight based on a total weight of the polyethylene terephthalate resin including the crystallization rate reducing agent.

The polyethylene terephthalate resin is not specifically limited and may be prepared and used by a method known in the art. Alternatively, a commercially available material may be used.

For example, the polyethylene terephthalate resin may be prepared by reacting a terephthalic acid compound with a glycol-based compound (except for diethylene glycol and neopentyl glycol) such as ethylene glycol in the presence of one or more crystallization rate reducing agents selected from the group consisting of isophthalic acid, cyclohexylene dimethanol, diethylene glycol and neopentyl glycol.

The polyethylene terephthalate resin may have a melting point of 252° C. or less, particularly 244 to 248° C. In this case, the melt flow index of the composite resin composition may be improved, thus improving moldability.

In the present disclosure, the melting point may be measured using a method known in the art. For example, a heat absorption peak may be measured using a differential scanning calorimeter (DSC).

The amount of the polyethylene terephthalate resin may be 1 to 10% by weight, particularly 3 to 8% by weight, based on 100% by weight of a total of the composite resin (polycarbonate resin+polybutylene terephthalate resin+polyethylene terephthalate resin). When the amount of the polyethylene terephthalate resin is less than the range, an automobile interior product prepared using a composite resin composition including the polyethylene terephthalate resin may be cracked. When the amount of the polyethylene terephthalate resin exceeds the range, the stiffness and heat resistance of an automobile interior product prepared using a composite resin composition including the composite resin composition are deceased.

In the present disclosure, the hydrolysis stabilizer may be composed of a quaternary system prepared by mixing a polyorganosiloxane-polycarbonate resin, a (meth)acrylate compound-conjugated diene compound-aromatic vinyl compound copolymer, a dialkyl phthalate compound and a carboxy-reactive epoxy resin, unless otherwise specified.

The polyorganosiloxane-polycarbonate resin according to an embodiment of the present invention is a block copolymer. When a composite resin composition includes the polyorganosiloxane-polycarbonate resin together with a (meth)acrylate compound-conjugated diene compound-aromatic vinyl compound copolymer described below, the hydrolysis resistance stability of the composite resin composition is greatly affected and an automobile interior product prepared using the composite resin composition exhibits a hydrolysis-resistant stabilization effect.

The polyorganosiloxane-polycarbonate resin is not specifically limited so long as the properties thereof can be secured and may include preferably a polysiloxane-polycarbonate copolymer, a polycarbonate-polysiloxane polymer or a polysiloxane-polycarbonate polymer. Preferably, the polyorganosiloxane-polycarbonate resin includes a diorganosiloxane block including a structural unit represented by Formula 1 below:

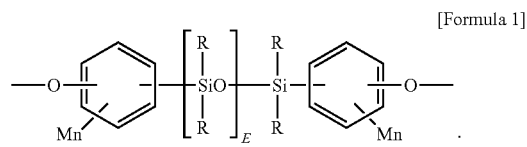

[Formula 1]

In Formula 1, the length (E) of a polydiorganosiloxane block is 20 to 60, respective R groups are the same or different and are independently selected from C1-C13 alkyl, C1-C13 alkoxy, C2-C13 alkenyl, C2-C13 alkenyloxy, C3-C13 cycloalkyl, C3-C13 cycloalkoxy, C6-C13 aryl, C6-C13 aryloxy, C7-C13 aralkyl, C7-C13 aralkyloxy, C7-C13 alkylaryl and C7-C13 alkylaryloxy; respective M are the same or different and are selected from among halogen, cyano, nitro, C1-C8 alkylthio, C1-C8 alkyl, C1-C8 alkoxy, C2-C8 alkenyl, C2-C8 alkenyloxy, C3-C8 cycloalkyl, C1-C8 cycloalkoxy, C6-C10 aryl, C6-C10 aryloxy, C7-C12 aralkyl, C7-C12 aralkyloxy, C7-C12 alkylaryl and C7-C12 alkylaryloxy; and respective n are independently an integer of 0 to 4.

In the present disclosure, the polycarbonate-diorganosiloxane block copolymer may include a diorganosiloxane block represented by Formula 2 below:

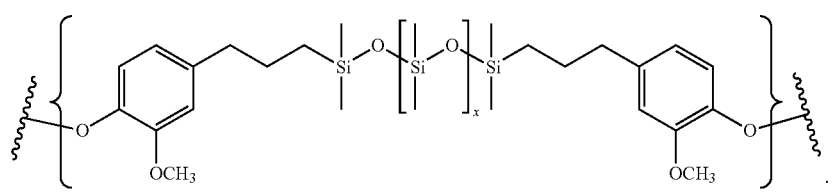

[Formula 2]

In Formula 2, x represents an integer of 20 to 60, and a terminal group of a short chain directly connected to Si represents CH3.

In the present disclosure, the polycarbonate block may be derived from a bisphenol-A monomer, and the diorganosiloxane block of Formula 2 may be derived from a dihydroxypolysiloxane compound obtained by reacting dihydroxyarylene with, for example, α,ω-bisacetoxypolydiorganosiloxane in a phase transition condition.

The dihydroxypolysiloxane compound may be prepared by platinum catalyzed addition reaction between siloxane hydrides.

The polyorganosiloxane-polycarbonate resin may include a diorganosiloxane-derived block in an amount of 5 to 30% by weight, particularly 10 to 25% by weight (calculated based on the weight of the diorganosiloxane compound). When the diorganosiloxane-derived block is present in a small amount outside the range, the effect of reinforcing physical properties is decreased so that hydrolysis resistance stability is insignificant. When the diorganosiloxane-derived block is present in an excessive amount, moldability is decreased which may cause problems in the appearance of components.

In the present disclosure, % by weight of a unit in a polymer, % by weight of a unit, or % by weight of a block may mean % by weight of a derived monomer.

In addition, in the present disclosure, % by weight of a unit in a polymer, % by weight of a unit, or % by weight of a block may be measured by a method generally used in the technical field to which the present invention pertains. As another method, on the premise that all monomers are polymerized, the amounts of added monomers may be defined as an amount such as a unit in a prepared polymer.

The polyorganosiloxane-polycarbonate resin may have a flow index of 1 to 5 g/10 min, 1 to 4 g/10 min, or 1 to 3 g/10 min. When the flow index of the polyorganosiloxane-polycarbonate resin is below the range, it is difficult to perform injection molding. When the flow index of the polyorganosiloxane-polycarbonate resin is too high, moldability, mechanical properties and chemical resistance are decreased so that problems in the appearance of components may occur.

The amount of the polyorganosiloxane-polycarbonate resin may be 20 to 50% by weight, 30 to 50% by weight as a particular example, preferably 35 to 45% by weight, based on 100% by weight of a total of the hydrolysis stabilizer (polyorganosiloxane-polycarbonate resin+(meth)acrylate compound-conjugated diene compound-aromatic vinyl compound copolymer+dialkyl phthalate compound+carboxy-reactive epoxy resin). When the amount of the polyorganosiloxane-polycarbonate resin is less than the range, an automobile interior product prepared using a composite resin composition including the polyorganosiloxane-polycarbonate resin may be cracked. When the amount of the polyorganosiloxane-polycarbonate resin exceeds the range, the stiffness and heat resistance of an automobile interior product prepared using a composite resin composition including the polyorganosiloxane-polycarbonate resin are decreased.

A (meth)acrylate compound-conjugated diene compound-aromatic vinyl compound copolymer according to an embodiment of the present invention may compensate for reduced physical properties due to the polycarbonate resin and the polyester resin. An automobile interior product prepared using a composite resin composition including the (meth)acrylate compound-conjugated diene compound-aromatic vinyl compound copolymer may have improved impact resistance, mechanical properties, and hydrolysis resistance stability.

The (meth)acrylate compound-conjugated diene compound-aromatic vinyl compound copolymer may be a graft copolymer including 40 to 80% by weight of a conjugated diene compound, 10 to 40% by weight of an aromatic vinyl compound and 1 to 20% by weight of a vinyl cyanide compound, preferably a graft copolymer including 50 to 70% by weight of a conjugated diene compound, 20 to 35% by weight of an aromatic vinyl compound and 1 to 15% by weight of a vinyl cyanide compound, more preferably a graft copolymer including 55 to 65% by weight of a conjugated diene compound, 25 to 35% by weight of an aromatic vinyl compound and 5 to 15% by weight of a vinyl cyanide compound. When the amount of the conjugated diene compound is below the range, impact resistance is decreased. When the amount of the conjugated diene compound is too high, stiffness (modulus of elasticity) is decreased. In addition, when the amount of the vinyl cyanide compound is too small, the effect of reinforcing rigidity is insufficient. When the amount of the vinyl cyanide compound is too high, impact resistance is decreased.

The (meth)acrylate compound included in the (meth) acrylate compound-conjugated diene compound-aromatic vinyl compound copolymer of the present invention may include a general (meth)acrylate compound, for example, methacrylate or acrylate, without being limited to a specific (meth)acrylate compound. For example, the (meth)acrylate compound may be one or more selected from methacrylate and acrylate, preferably methacrylate. In addition, the conjugated diene compound included in the (meth)acrylate compound-conjugated diene compound-aromatic vinyl compound copolymer may include, for example, butadiene, without being limited to a specific conjugated diene compound. In addition, the aromatic vinyl compound included in the (meth)acrylate compound-conjugated diene compound-aromatic vinyl compound copolymer may be, for example, one or more selected from among styrene, α-methyl styrene, α-ethyl styrene and p-methyl styrene, preferably styrene.

Accordingly, the (meth)acrylate compound-conjugated diene compound-aromatic vinyl compound copolymer may include a resin prepared by polymerizing the components in the above specific content ranges. Preferably, the (meth)acrylate compound-conjugated diene compound-aromatic vinyl compound copolymer includes a resin including a (meth)acrylate component in an appropriate amount and, accordingly, being capable of improving heat resistance. As needed, an alkyl acrylate component may be further included in addition to the (meth)acrylate component.

The (meth)acrylate compound-conjugated diene compound-aromatic vinyl compound copolymer may be used in a powder form having a particle size of 0.2 to 0.4 μm, particularly a particle size of 0.25 to 0.35 μm. In this case, impact strength and injection molding properties are improved.

In the present disclosure, a particle size may be measured according to a known method of measuring the size of particles. Specifically, the average particle diameter of the metal pigment may be measured using BET analysis equipment (Surface Area and Porosity Analyzer ASAP 2020, Micromeritics Co.) according to a nitrogen gas adsorption method. More particularly, a particle size may be measured using ASAP 2020 analysis equipment at room temperature after adding 0.3 g to 0.5 g of a sample to a tube and pre-treating the sample at 100° C. for 8 hours. An average value may be obtained by measuring the same sample three times.

The amount of the (meth)acrylate compound-conjugated diene compound-aromatic vinyl compound copolymer may be 48.5 to 65% by weight, particularly 50 to 65% by weight, based on 100% by weight of a total of the hydrolysis stabilizer (polyorganosiloxane-polycarbonate resin+(meth)acrylate compound-conjugated diene compound-aromatic vinyl compound copolymer+dialkyl phthalate compound+carboxy-reactive epoxy resin). When the amount of the (meth)acrylate compound-conjugated diene compound-aromatic vinyl compound copolymer is less than the range, an automobile interior product prepared using a composite resin composition including the (meth)acrylate compound-conjugated diene compound-aromatic vinyl compound copolymer has low impact resistance. When the amount of the (meth)acrylate compound-conjugated diene compound-aromatic vinyl compound copolymer exceeds the range, an automobile interior product prepared using a composite resin composition including the (meth)acrylate compound-conjugated diene compound-aromatic vinyl compound copolymer exhibits deteriorated stiffness.

A dialkyl phthalate compound according to an embodiment of the present invention serves to inhibit various routes of transesterification reactions between the polycarbonate resin and polybutylene terephthalate resin described above.

For reference, when a polycarbonate (PC) resin is mixed with a polybutylene terephthalate (PBT) resin, physical properties are reduced by three types of transesterification reactions as shown below, so that appropriate reaction inhibition is required.

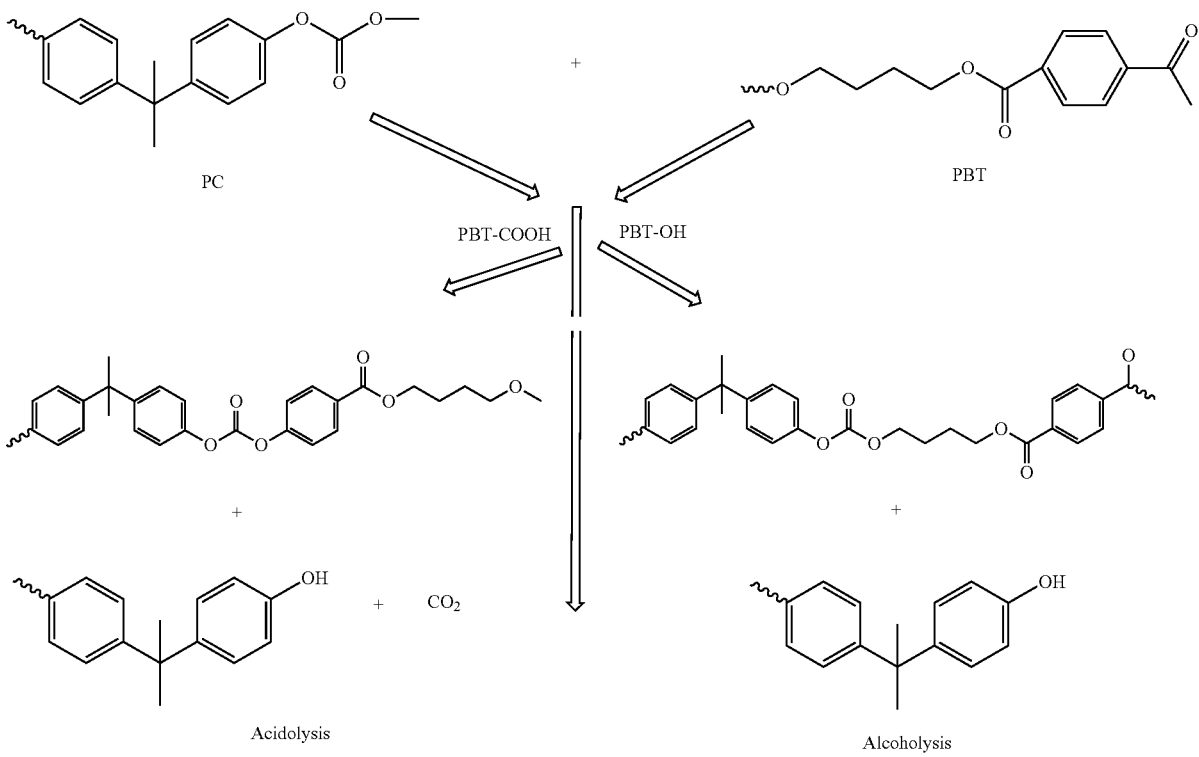

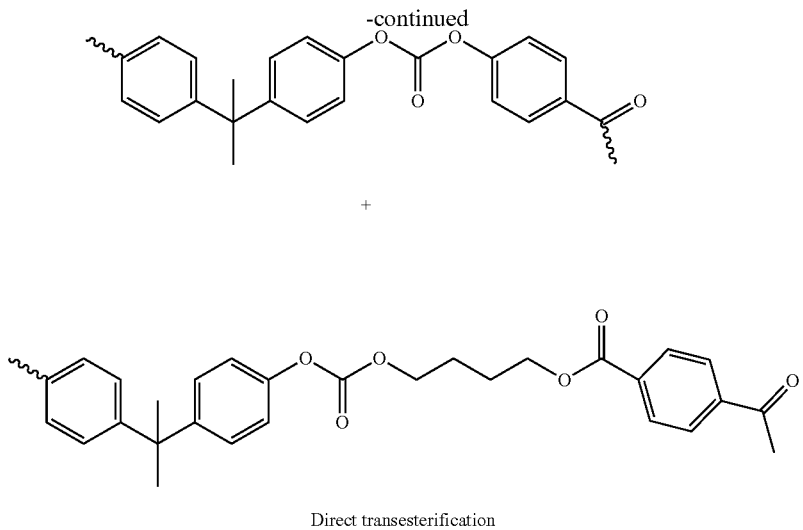

Direct transesterification

The dialkyl phthalate compound may be a compound being capable of securing transesterification inhibitory properties, preferably a phthalate compound having an alkyl group having 5 to 8 carbon atoms. As a particular example, di-n-pentyl phthalate, di-n-octyl phthalate or a combination thereof may be used.

The amount of the dialkyl phthalate compound may be 0.1 to 10% by weight, 1 to 10% by weight as a particular example, preferably 3 to 10% by weight, based on 100% by weight of a total of the hydrolysis stabilizer (polyorganosiloxane-polycarbonate resin+(meth)acrylate compound-conjugated diene compound-aromatic vinyl compound copolymer+dialkyl phthalate compound+carboxy-reactive epoxy resin). When the amount of the dialkyl phthalate compound exceeds the range, the dialkyl phthalate compound is generated as a gas in a molded article during injection molding, which may affect the appearance.

The carboxy-reactive epoxy resin according to an embodiment of the present invention may be used to improve chemical resistance while providing hydrolysis resistance stability to an automobile interior product prepared using the composite resin composition according to the present disclosure.

As used herein, the term "carboxy-reactive epoxy resin" refers to an epoxy-functional alkylene (meth)acrylic copolymer generated from an epoxy-functional (meth)acrylic monomer and an alkylene, unless otherwise specified.

As used herein, the term "(meth)acrylic" includes both acrylic and methacrylic monomers, unless otherwise specified, and the term "(meth)acrylate" includes both acrylate and methacrylate monomers, unless otherwise specified.

Specific examples of the epoxy-functional (meth)acrylic monomer may include monomers containing a 1,2-epoxy group such as glycidyl acrylate and glycidyl methacrylate.

The carboxy-reactive epoxy resin used in the present disclosure may be one or more selected from, as a particular example, an ethylene-n-butyl acrylate-glycidyl methacrylate copolymer, an ethylene-glycidyl methacrylate copolymer, an ethylene-acrylic ester-glycidyl methacrylate copolymer, an ethylene-methyl acrylate-glycidyl methacrylate copolymer, an ethylene-dimethacrylate-glycidyl methacrylate copolymer, an ethylene-acrylate-glycidyl methacrylate copolymer and an ethylene-vinyl acetate-glycidyl methacrylate copolymer.

The carboxy-reactive epoxy resin of the present disclosure may be, for example, a copolymer prepared by polymerizing 1 to 15% by weight or 3 to 10% by weight of a glycidyl methacrylate unit, 60 to 74% by weight or 63 to 74% by weight of an ethylene unit, and 20 to 30% by weight or 25 to 30% by weight of an n-butyl acrylate. Here, when the amount of the glycidyl methacrylate unit is too high, the appearance of an injection-molded article manufactured using a composite resin composition including the glycidyl methacrylate unit is worsened due to a decrease in the flow of the composition.

The amount of the carboxy-reactive epoxy resin may be 0.1 to 10% by weight, 0.1 to 5% by weight as a particular example, preferably 1 to 3% by weight, based on 100% by weight of a total of the hydrolysis stabilizer (polyorganosiloxane-polycarbonate resin+(meth)acrylate compound-conjugated diene compound-aromatic vinyl compound copolymer+dialkyl phthalate compound+carboxy-reactive epoxy resin). When the amount of the carboxy-reactive epoxy resin exceeds the range, gas may be generated from the surface of an automobile interior product prepared using a composite resin composition including the carboxy-reactive epoxy resin, resulting in worsening of the appearance.

In particular, the hydrolysis stabilizer (polyorganosiloxane-polycarbonate resin+(meth)acrylate compound-conjugated diene compound-aromatic vinyl compound copolymer+dialkyl phthalate compound+carboxy-reactive epoxy resin) may be included in an amount of 10 to 40 parts by weight, 10 to 30 parts by weight as a particular example, 10 to 20 parts by weight as a preferred example, based on 100 parts by weight of the composite resin including a polycarbonate resin, a polybutylene terephthalate resin and a polyethylene terephthalate resin. When the amount of the hydrolysis stabilizer exceeds the range, the appearance of the surface of an injection-molded article prepared an automobile interior product prepared using a composite resin composition including the hydrolysis stabilizer may be worsened. When the amount of the hydrolysis stabilizer is too low, sufficient hydrolysis resistance stability and further transesterification inhibitory effect may not be provided. Within the above range, impact strength, specifically low-temperature impact strength, heat resistance and processability may be improved.

To improve the flowability of the composite resin composition according to an embodiment of the present invention, an appropriate additive may be further included.

Specifically, one or more additives selected from a lubricant, a heat stabilizer, and a UV absorber may be further included.

The lubricant is not specifically limited so long as it can ensure ease of extraction and flowability of an injection screw used for manufacturing an automobile interior product using a composite resin composition including the lubricant.

The lubricant is not specifically limited so long as it can be used in the present invention and the above characteristics can be secured. Preferably, the lubricant may include ethylene bis stearamide, polyethylene wax or a combination thereof.

The amount of the lubricant may be 0.01 to 5 parts by weight, particularly 0.1 to 3 parts by weight, based on 100 parts by weight of the composite resin. When the amount of the lubricant exceeds the range, appearance problems such as stains may be generated on the surface of an automobile interior product prepared using a composite resin composition including the lubricant so that appearance may be worsened.

The heat stabilizer is not specifically limited so long as an automobile interior product prepared using a composite resin composition including the heat stabilizer can be prevented from being deformed due to high temperature.

The heat stabilizer is not specifically limited so long as the above characteristics can be secured, and is preferably a phenolic antioxidant.

The phenolic antioxidant may further include a hindered phenol-based stabilizer having crystallization temperature (Tm) of 110 to 130° C. As a particular example, the phenolic antioxidant may include tetrakise[ethylene-3-(3,5-di-t-butyl-hydroxyphenyl)propionate], octadecyl 3-(3,5-di-t-butyl-4-hydroxyphenyl)propionate or a combination thereof.

The amount of the heat stabilizer may be 0.01 to 5 parts by weight, particularly 0.1 to 3 parts by weight, based on 100 parts by weight of the composite resin. Then the amount of the heat stabilizer is too high, appearance problems such as stains may occur on the surface of an automobile interior product prepared using a composite resin composition including so that appearance may be worsened.

The UV absorber is not specifically limited so long as an automobile interior product prepared using a composite resin composition including the UV absorber can be prevented from being deformed by light.

The UV absorber is not specifically limited so long as the above characteristics can be secured, and may be preferably a benzotriazole-based compound, a triazine-based compound, or the like.

The triazine-based compound may be one or more selected from the group consisting of, for example, 2,4-diphenyl-6-(2-hydroxy-4-methoxyphenyl)-1,3,5-triazine, 2,4-diphenyl-6-(2-hydroxy-4-ethoxyphenyl)-1,3,5-triazine, 2,4-diphenyl-6-(2-hydroxy-4-butoxyphenyl)-1,3,5-triazine, 2,6-diphenyl-4-(2-hydroxy-4-hexyloxyphenyl)-1,3,5-triazine, 2,4-diphenyl-6-(2-hydroxy-4-octyloxyphenyl)-1,3,5-triazine, 2,4-diphenyl-6-(2-hydroxy-4-benzyloxyphenyl)-1,3,5-triazine, 2,4,6-tris (2-hydroxy-4-octyloxyphenyl)-1,3,5-triazine, 2,4,6-tris (2-hydroxy-4-benzyloxyphenyl)-1,3,5-triazine, 2,4,6-tris (2-hydroxy-4-ethoxyethoxyphenyl)-1,3,5-triazine, 2,4,6-tris (2-hydroxy-4-butoxyethoxyphenyl)-1,3,5-triazine, 2,4,6-tris (2-hydroxy-4-methoxycarbonylpropyloxyphenyl)-1,3,5-triazine, 2,4,6-tris (2-hydroxy-3-methyl-4-ethoxyphenyl)-1,3,5-triazine, 2,4,6-tris (2-hydroxy-3-methyl-4-hexyloxyphenyl)-1,3,5-triazine, 2,4,6-tris (2-hydroxy-3-methyl-4-ethoxyethoxyphenyl)-1,3,5-triazine, 2,4,6-tris (2-hydroxy-3-methyl-4-ethoxycarbonylethyloxyphenyl)-1,3,5-triazine, 2,4-bis(2,4-dimethylphenyl)-6-(2-hydroxy-4-N-octyloxyphenyl)-1,3,5-triazine and 2-(4,6-diphenyl-1,3,5-triazine-2-yl)-5-(2-(2-ethylhexanoyloxy)ethoxy)phenol.

The benzotriazole-based compound may be one or more selected from among, for example, 2,4-di-t-butyl-6-(5-chlorobenzotriazole-2-yl) phenol, 2-(2'-hydroxy-5'-oxyphenyl)-benzotriazole, 2-(2'-hydroxymethylphenyl)benzotriazole, 2-(2'-hydroxy-3',5'-bis (α,α-dimethylbenzylphenyl)benzotriazole, 2-(2'-hydroxy-3',5'-dibutylphenyl)benzotriazole, 2-(2'-hydroxy-3'-tert-butyl-5'-methylphenyl)-5-chlorobenzotriazole, 2, (2'-hydroxy-3',5'-di-tert-amyl)benzotriazole, 2,2'-methylene bis[4-(1,1,3,3-tetramethylbutyl)-6-(2-N-benzotriazole-2-yl)phenol', 2-(4,6-diphenyl-1,3,5-triazine-2-yl)-5-hexyloxyl-phenol and 2-(2H-benzotriazole-2-yl)-4,6-bis (1-methyl-1-phenylethyl) phenol.

The amount of the UV absorber may be 0.01 to 5 parts by weight, particularly 0.1 to 3 parts by weight, based on 100 parts by weight of the composite resin. Within these ranges, physical properties balance is excellent and light resistance is further improved.

A specimen may be manufactured using the composite resin composition. A heat deflection temperature under high load, measured under 1.82 MPa according to ISO 75, of the specimen may be 92° C. or more. As a particular example, the heat deflection temperature under high load may be 92 to 95° C. The specimen will be described in detail below.

In the present disclosure, the heat deflection temperature under high load may be measured under a high load of 1.82 MPa according to ISO 75.

A hydrolysis-resistance retention rate, represented by Equation 1 below, of the composite resin composition may be, for example, 79% or more. As a particular example, the hydrolysis-resistance retention rate may be 80 to 92%. In this case, optimal balance between heat resistance and hydrolysis-resistance retention may be maintained.

Hydrolysis-resistance retention rate=(Izod impact strength after aging/Izod impact strength before aging)×100     [Equation 1]

(in the equation, aging is performed for 168 hr in a chamber under conditions of 85° C. and 85%, and the Izod impact strength is a notch impact strength measured at 23° C. according to ISO 180/1A.)

Method of Preparing Composite Resin Composition

Hereinafter, a method of preparing the composite resin composition of the present invention is described. In describing the method of preparing the composite resin composition of the present invention, all of the above particulars regarding the composite resin composition are included.

The method of preparing the composite resin composition of the present disclosure includes, for example, a step of feeding 100 parts by weight of a composite resin including 60 to 79% by weight of a polycarbonate resin, a polybutylene terephthalate resin 10 to 30% by weight, and 1 to 10% by weight of a polyethylene terephthalate resin; and 10 to 40 parts by weight of a hydrolysis stabilizer prepared by mixing 20 to 50% by weight of a polyorganosiloxane-polycarbonate resin, 48.5 to 65% by weight of a (meth)acrylate compound-conjugated diene compound-aromatic vinyl compound copolymer, 0.1 to 10% by weight of a dialkyl phthalate compound and 0.1 to 10% by weight of a carboxy-reactive epoxy resin into an extruder, and melt-kneading and extruding the same.

In the melt-kneading step, for example, the aforementioned other additives may be included.

The melt-kneading and extruding step may be performed, for example, using one or more selected from a group consisting of a single-screw extruder, a twin-screw extruder, and a Banbury mixer, preferably using a twin-screw extruder. The melt-kneading and extruding step may be performed by uniformly mixing components using the extruder, and then conducting extrusion to obtain a composite resin composition in a pellet form. In this case, mechanical property deterioration and thermal property decrease are prevented and excellent plating adhesion and appearance are provided.

A step of preparing pellets using an extrusion kneader may be performed, for example, under conditions of an extrusion temperature of 250 to 300° C., a flow ratio (F/R) of 50 to 90 kg/hr, and a screw rotation number of 280 to 490 rpm, preferably under conditions of an extrusion temperature of 260 to 300° C., F/R of 60 to 90 kg/hr, and a screw rotation number of 300 to 390 rpm.

After extruding the composite resin composition, a step of injection-molding under conditions of an injection temperature of 240 to 280° C., particularly 250 to 270° C., a mold temperature of 40 to 80° C., particularly 50 to 70° C., and an injection rate of 10 to 50 mm/sec, particularly 20 to 40 mm/sec may be further performed.

Further, an automobile interior product including the composite resin composition of the present invention is described. In describing an automobile interior product including the composite resin composition of the present invention, all of the above particulars regarding the composite resin composition are included.

Automobile Interior Product

Since the composite resin composition of the present invention is sufficiently optimized due to use of the above components, the composite resin composition may be used for an automobile interior product requiring moldability, mechanical properties, heat resistance under high load, and chemical resistance.

The automobile interior product may be manufactured by a method generally used in the art. For example, using a melted kneaded material or pellets of the composite resin composition according to the present invention or a sheet (a plate) molded using the melted kneaded material or pellets as a low material, an injection molding method, an injection compression molding method, an extrusion molding method, a sheet casting method, a press molding method, a pressure forming method, a heat bending method, a compression molding method, a calender molding method, a rotating molding method, or the like may be applied.

For example, the composite resin composition of the present disclosure may be prepared in the form of pellets by feeding a polycarbonate resin, a polybutylene terephthalate resin, a polyethylene terephthalate resin, a polyorganosiloxane-polycarbonate resin, a (meth)acrylate compound-conjugated diene compound-aromatic vinyl compound copolymer, a dialkyl phthalate compound, a carboxy-reactive epoxy resin and additives into a main inlet of a twin-screw extruder (φ40, L/D: 42, SM Platek equipment), set to 280° C., at 375 rpm and at a flow ratio of 75 kg/h and melt-kneading and extruding the same.

The pellets are fed into an injection molding machine to prepare an automobile interior product.

To indirectly confirm the physical properties of the automobile interior product, the pellets are injected at an injection temperature of 260° C., a mold temperature of 60° C., and an injection rate of 30 mm/sec using an injection molding machine (ENGEL, 80 tons), thereby manufacturing a specimen according to ISO standards.

The flow index (melt flow rate), measured at 250° C. under a load of 5 kg according to ISO 1133, of the manufactured specimen may be, for example, 12 g/10 min or more, particularly, 12 to 13 g/10 min.

In addition, the Izod notch impact strength, measured at 23° C. according to ISO 1133, of the specimen may be, for example, 55.7 kJ/m$^2$ or more, particularly 61 to 64 kJ/m$^2$.

In addition, the tensile strength, measured at a speed of 5 mm/min according to ISO 527, of the specimen may be, for example, 49 MPa or more, particularly 53 to 66 MPa.

In addition, the flexural strength, which is measured at a speed of 2 mm/min using SPAN 64 according to ISO 178, of a ⅛ inch specimen may be, for example, 77 MPa or more, particularly 81 to 85 MPa, and a flexural modulus of which may be 1950 MPa or more, particularly 1963 to 2123 MPa.

In addition, the density, measured according to ISO 1183, of the specimen may be 1.19 to 1.22 g/cm3, particularly 1.19 to 1.20 g/cm3.

The automobile interior product may be particularly a floor console front tray, a cup holder, an inner garnish, a switch bezel, a cup holder housing, or an indicator panel, without being limited thereto.

That is, the composite resin composition according to an embodiment of the present invention includes a composite resin including a polycarbonate resin, a polybutylene terephthalate resin and a polyethylene terephthalate resin in specific % by weight; and a hydrolysis stabilizer prepared by mixing a polyorganosiloxane-polycarbonate resin, a (meth) acrylate compound-conjugated diene compound-aromatic vinyl compound copolymer, a dialkyl phthalate compound and a carboxy-reactive epoxy resin in specific % by weight, and an automobile interior product prepared using the composition exhibits improved heat resistance and hydrolysis resistance stability, thus satisfying the balance between physical properties such as mechanical properties and fluidity and improving product reliability and appearance.

In describing the composite resin composition of the present invention, the method of preparing the same, and an automobile interior product including the composite resin composition, other conditions or equipment not expressly described may be appropriately selected within a range commonly practiced in the art, and there is no particular limitation.

Hereinafter, embodiments of the present invention will be described in detail so that those of ordinary skill in the art can easily carry out the present invention. However, the present invention may be embodied in various different forms and is not limited to the embodiments described herein.

EXAMPLES

Examples 1 to 3, Comparative Examples 1 to 10, and Reference Examples 1 and 2: Preparation of Composite Resin Composition Raw materials used in examples are as follows.
A-1) Polycarbonate resin: flow index: 3 (MI, 300° C., 1.2 kg)
A-2) Polycarbonate resin: flow index: 10 (MI, 300° C., 1.2 kg)

A-3) Polycarbonate resin: flow index: 15 (MI, 300° C., 1.2 kg)
B) Polyorganosiloxane-polycarbonate (organosiloxane block 5 to 15 wt %): flow index: 2 (MI, 300° C., 1.2 kg)
C-1) Polybutylene terephthalate resin: intrinsic viscosity (IV): 0.8
C-2) Polybutylene terephthalate resin: intrinsic viscosity (IV): 1.0
C-3) Polybutylene terephthalate resin: intrinsic viscosity (IV): 1.2
D-1) Polyethylene terephthalate HOMO resin: intrinsic viscosity (IV): 0.8, melting point: 253 to 255° C.
D-2) Polyethylene terephthalate CO resin: intrinsic viscosity (IV): 0.8, melting point: 246° C., an isophthalic acid as a crystallization rate reducing agent 5 wt %
E) Methacrylate-butadiene-styrene (particle size: 0.3 μm, methylmethacrylate 15 wt %, butadiene 80 wt %, styrene 5 wt %, weight average molecular weight: 103,000 g/mol)
F) Ethylene/n-butyl acrylate/glycidyl methacrylate (ethylene 67 wt %, n-butyl acrylate 28 wt %, glycidyl methacrylate 5 wt %)
G) Di-n-pentyl phthalate
H) Polyethylene wax-based lubricant
Heat Stabilizer (High Phenolic Antioxidant)

Raw materials of summarized in Table 1 below were mixed to prepare a composite resin composition, and then the composite resin composition having uniform dispersion was manufactured in the form of pellets through extrusion. Next, the pellets were heated and injected into a mold, followed by cooling. The cooled pellets were manufactured into a specimen to be used as an automobile interior product in an injection process of producing components.

Specifically, ingredients summarized in Table 1 below were mixed using a mixer, and then were fed into at 375 rpm and at a flow ratio of 75 kg/ha into a main inlet of a twin-screw extruder (φ40, L/D: 42, SM Platek equipment) set to 280° C., followed by extrusion for 1 to 3 minutes. As a result, composite resin composition pellets were produced.

The produced pellets were dried in a 80° C. convection oven for 4 hours or more, and then were injected under conditions of an injection temperature of 260° C., a mold temperature of 60° C., and an injection rate of 30 mm/sec using an injection molding machine (ENGEL, 80 tons), thereby manufacturing an ISO specimen.

TABLE 1

| Class. | Ex 1 | Ex 2 | Ex 3 | Comp Ex 1 | Comp Ex 2 | Comp Ex 3 | Comp Ex 4 | Comp Ex 5 |
|---|---|---|---|---|---|---|---|---|
| A-2 | 62.7 | 62.7 | 62.7 | 62.7 | 62.7 | 62.7 | 69.7 | 63.2 |
| B | 5.0 | 5.0 | 5.0 | 5.0 | 5.0 | 5.0 | 5.0 | 5.0 |
| C-1 | — | — | — | — | — | — | — | — |
| C-2 | — | — | 18.0 | — | — | — | — | — |
| C-3 | 18.0 | 18.0 | 23.0 | 13.0 | 16.0 | 23.0 | 18.0 | 18.0 |
| D-1 | — | — | — | — | — | — | — | — |
| D-2 | 5.0 | 5.0 | — | 10.0 | 5.0 | 5.0 | 5.0 | 5.0 |
| E | 7.0 | 7.0 | 7.0 | 7.0 | 9.0 | 7.0 | — | 7.0 |
| F | 0.5 | 0.5 | 0.5 | 0.5 | 0.5 | 0.5 | 0.5 | — |
| G | 1.0 | 1.0 | 1.0 | 1.0 | 1.0 | 1.0 | 1.0 | 1.0 |
| H | 0.3 | 0.3 | 0.3 | 0.3 | 0.3 | 0.3 | 0.3 | 0.3 |
| I | 0.5 | 0.5 | 0.5 | 0.5 | 0.5 | 0.5 | 0.5 | 0.5 |

| Class. | Comp Ex 6 | Comp Ex 7 | Comp Ex 8 | Comp Ex 9 | Comp Ex 10 | Ref Ex 1 | Ref Ex2 |
|---|---|---|---|---|---|---|---|
| A-2 | 63.7 | 74.7 | 70.2 | 64.2 | 76.2 | 62.7 | 62.7 |
| B | 5.0 | — | 5.0 | 5.0 | — | 5.0 | 5.0 |
| C-1 | — | — | — | — | — | — | 18.0 |
| C-2 | — | — | — | — | — | — | — |
| C-3 | 18.0 | 18.0 | 18.0 | 18.0 | 18.0 | 18.0 | — |
| D-1 | — | — | — | — | — | 5.0 | — |
| D-2 | 5.0 | 5.0 | 5.0 | 5.0 | 5.0 | — | 5.0 |
| E | 7.0 | — | — | 7.0 | — | 7.0 | 7.0 |
| F | 0.5 | 0.5 | — | — | — | 0.5 | 0.5 |
| G | — | 1.0 | 1.0 | — | — | 1.0 | 1.0 |
| H | 0.3 | 0.3 | 0.3 | 0.3 | 0.3 | 0.3 | 0.3 |
| I | 0.5 | 0.5 | 0.5 | 0.5 | 0.5 | 0.5 | 0.5 |

For reference, the total weight % of the raw materials A-1 to I summarized in Table 1 is 100% by weight.

Experimental Example 1: Physical Property Evaluation of Automobile Interior Product Specimen The automobile interior product specimens manufactured according to Examples 1 to 3, Comparative Examples 1 to 10, and Reference Examples 1 and 2 were subjected to physical property evaluation. The evaluation criteria are as follows.

Fluidity (Melt Flow Rate): Implemented according to ISO 1133 (250° C., 5 kg)
Impact strength (IZOD): Implemented according to ISO 180/1A (Notched, 23° C.)
Tensile strength: Implemented according to ISO 527 (50 mm/min)
Flexural strength, flexural modulus: Implemented according to ISO 178 (⅛ inch, SPAN 64, speed: 2 mm/min)
Heat deformation temperature: Implemented according to ISO 75 (high load: 1.82 MPa)
Density: Implemented according to ISO 1183
Hydrolysis-resistance retention rate: Calculated according to Equation 1 below using a notch impact strength (corresponding to Izod impact strength before aging) measured at 23° C. according to an Izod impact strength measurement test according to ISO 180/1A and a notch impact strength (corresponding to Izod impact strength after aging) measured at 23° C. after aging for 168 hr in a chamber under a condition of 85° C./85%. When a calculated value is less than 75%, it is determined that a hydrolysis-resistance retention rate is poor.

Hydrolysis-resistance retention rate=(Izod impact strength after aging/Izod impact strength before aging)×100     [Equation 1]

The results measured according to the evaluation criteria are summarized in Table 2 below.

is used in an excessive amount, a flexural modulus and a hydrolysis-resistance retention rate are deteriorated compared to Examples 1 to 3.

In addition, it can be confirmed that in the case of Comparative Example 2 in which a (meth)acrylate compound-conjugated diene compound-aromatic vinyl compound copolymer as a hydrolysis stabilizer is used in an amount exceeding an appropriate range, similar hydrolysis-resistance retention rate is exhibited, but flexural modulus and high-load heat deflection temperature are poor, compared to Examples 1 to 3.

TABLE 2

| Class. | Ex 1 | Ex 2 | Ex 3 | Comp Ex 1 | Comp Ex 2 | Comp Ex 3 | Comp Ex 4 | Comp Ex 5 |
|---|---|---|---|---|---|---|---|---|
| Fluidity (g/10 min) | 13 | 13 | 13 | 13 | 15 | 14 | 18 | 13 |
| Impact strength (kJ/m$^2$) | 64 | 61 | 61 | 59 | 61 | 68 | 55 | 60 |
| Tensile strength (MPa) | 54 | 54 | 54 | 54 | 57 | 60 | 62 | 53 |
| Flexural strength (MPa) | 85 | 80 | 81 | 80 | 82 | 87 | 90 | 84 |
| Flexural modulus (MPa) | 2123 | 1975 | 1963 | 1928 | 1930 | 2090 | 2200 | 2100 |
| Heat def. temp. (° C. under high load) | 95 | 93 | 92 | 93 | 81 | 94 | 96 | 95 |
| Hydroly. resist. retention rate (%) | 80 | 92 | 81 | 77 | 83 | 48 | 35 | 60 |
| Density (g/cm3) | 1.19 | 1.20 | 1.19 | 1.19 | 1.20 | 1.20 | 1.19 | 1.19 |

| Class. | Comp Ex 6 | Comp Ex 7 | Comp Ex 8 | Comp Ex 9 | Comp Ex 10 | Ref Ex 1 | Ref Ex 2 |
|---|---|---|---|---|---|---|---|
| Fluidity (g/10 min) | 19 | 20 | 15 | 19 | 22 | 8 | 14 |
| Impact strength (kJ/m$^2$) | 57 | 50 | 47 | 56 | 35 | 64 | 60 |
| Tensile strength (MPa) | 60 | 64 | 62 | 60 | 61 | 66 | 53 |
| Flexural strength (MPa) | 80 | 91 | 90 | 80 | 92 | 80 | 80 |
| Flexural modulus (MPa) | 2140 | 2240 | 2210 | 2050 | 2300 | 1980 | 1925 |
| Heat def. temp. (° C. under high load) | 96 | 96 | 96 | 95 | 94 | 94 | 89 |
| Hydroly. resist. retention rate (%) | 61 | 38 | 33 | 59 | 28 | 84 | 81 |
| Density (g/cm3) | 1.19 | 1.19 | 1.21 | 1.19 | 1.21 | 1.20 | 1.20 |

Referring to Table 2, it can be confirmed that the composite resin compositions of Examples 1 to 3 according to the present invention can realize a density within an appropriate range and have improved impact strength, flexural modulus, high-load heat deflection temperature, and hydrolysis-resistance retention rate, so that automobile interior products manufactured using the composite resin compositions basically satisfy physical properties such as impact strength, tensile strength, and flexural strength, exhibit excellent chemical resistance and high-load heat resistance, and provide product reliability and appearance due to decreased gas generation during injection molding.

In addition, it can be confirmed that in the case of Comparative Example 1 in which a polyethylene terephthalate resin having a melting point within an appropriate range In addition, it can be confirmed that in the case of Comparative Example 3 in which a polyorganosiloxane-polycarbonate resin that is one of hydrolysis stabilizers is not used, similar mechanical properties and heat resistance are exhibited, but the hydrolysis-resistance retention rate is significantly poor, compared to Examples 1 to 3.

In addition, it can be confirmed that in the case of Comparative Example 4 to 10 in which the hydrolysis stabilizers are not appropriately mixed, the hydrolysis-resistance retention rate is significantly deteriorated, and the appearance of the injection-molded articles is worsened, compared to Examples 1 to 3.

Further, it can be confirmed that in the case of Reference Example 1 in which the melting point of the polyethylene terephthalate resin is inappropriate, the flow index is significantly poor, compared to Examples 1 to 3.

In addition, it can be confirmed that in the case of Reference Example 2 in which the intrinsic viscosity of the polybutylene terephthalate resin is inappropriate, the flow index and the heat deflection temperature under high load are poor, compared to Examples 1 to 3.

Comparative Examples 11 to 15: Composite Resin Composition Preparation

ISO specimens were manufactured in the same manner as in Example 1 described above except that raw materials for the composite resin composition were mixed as summarized in Table 3 below.

TABLE 3

| Classification | Comparative examples | | | | |
| --- | --- | --- | --- | --- | --- |
| | 11 | 12 | 13 | 14 | 15 |
| A-1 | 15.0 | 62.7 | — | 72.7 | 32.7 |
| A-2 | 47.7 | — | 31.4 | — | — |
| A-3 | — | — | 31.4 | — | — |
| B | 5.0 | 5.0 | 5.0 | — | 25.0 |
| C-1 | — | — | — | — | — |
| C-2 | — | — | — | — | — |
| C-3 | 18.0 | 18.0 | 18.0 | 18.0 | 18.0 |
| D-1 | — | — | — | — | — |
| D-2 | 5.0 | 5.0 | 5.0 | 5.0 | 5.0 |
| E | 7.0 | 7.0 | 7.0 | 2.0 | 17.0 |
| F | 0.5 | 0.5 | 0.5 | 0.5 | 0.5 |
| G | 1.0 | 1.0 | 1.0 | 1.0 | 1.0 |
| H | 0.3 | 0.3 | 0.3 | 0.3 | 0.3 |
| I | 0.5 | 0.5 | 0.5 | 0.5 | 0.5 |

Experimental Example 2: Evaluation of Physical Properties of Automobile Interior Product Specimen The physical properties of the automobile interior product specimens manufactured according to Comparative Examples 11 to 15 were evaluated as described above. The measurement results for evaluation are summarized in Table 4 below.

TABLE 4

| Classification | Unit | Comparative examples | | | | |
| --- | --- | --- | --- | --- | --- | --- |
| | | 11 | 12 | 13 | 14 | 15 |
| Fluidity | g/10 min | 11 | 10 | 14 | 19 | 6 |
| Impact strength | kJ/m$^2$ | 61 | 58 | 59 | 42 | 60 |
| Tensile strength | MPa | 58 | 59 | 57 | 64 | 48 |
| Flexural strength | MPa | 80 | 85 | 83 | 91 | 70 |
| Flexural modulus | MPa | 1990 | 2010 | 1945 | 2240 | 1870 |
| Heat deformation temperature | °C. under high load | 87 | 87 | 93 | 96 | 81 |
| Hydrolysis-resistance retention rate | % | 80 | 78 | 77 | 38 | 76 |
| Density | g/cm3 | 1.20 | 1.20 | 1.19 | 1.19 | 1.17 |

Referring to Tables 2 and 4, it can be confirmed that in the case of Comparative Examples 11 and 12 using a low-flow polycarbonate resin, fluidity and a heat deflection temperature under high load are significantly poor, compared to Examples 1 to 3.

In addition, it can be confirmed that in the case of Comparative Example 13 in which a polycarbonate resin having a flow index outside an appropriate range is used, mechanical properties such as a flexural modulus are deteriorated, compared to Examples 1 to 3.

In addition, it can be confirmed that in the case of Comparative Example 14 in which the amount of the hydrolysis stabilizer is less than an appropriate range, impact strength is significantly decreased, compared to Examples 1 to 3.

Further, it can be confirmed that in the case of Comparative Example 15 in which the amount of the hydrolysis stabilizer exceeds an appropriate range, fluidity is significantly deteriorated, and overall physical properties such as a tensile strength, a flexural strength, flexural modulus, a heat deformation temperature, and a density are poor, compared to Examples 1 to 3.

That is, the composite resin composition according to an embodiment of the present invention includes a composite resin comprising a polycarbonate resin, a polybutylene terephthalate resin and a polyethylene terephthalate resin in specific % by weight; and a hydrolysis stabilizer prepared by mixing a polyorganosiloxane-polycarbonate resin, a (meth)acrylate compound-conjugated diene compound-aromatic vinyl compound copolymer, a dialkyl phthalate compound and a carboxy-reactive epoxy resin in specific % by weight. In addition, an automobile interior product manufactured using the composition exhibits improved heat resistance and hydrolysis resistance stability, so that the balance between physical properties such as mechanical properties and fluidity is satisfied and excellent product reliability and appearance are provided.

The invention claimed is:
1. A composite resin-based composition, comprising:
   100 parts by weight of a composite resin comprising, based on 100% by weight of a total of the composite resin, 60 to 79% by weight of a polycarbonate resin, 20 to 30% by weight of a polybutylene terephthalate resin and 1 to 10% by weight of a polyethylene terephthalate resin; and
   10 to 40 parts by weight of a hydrolysis stabilizer prepared by mixing, based on 100% by weight of a total of the hydrolysis stabilizer, 20 to 50% by weight of a polyorganosiloxane-polycarbonate resin, 48.5 to 65% by weight of a (meth)acrylate compound-conjugated diene compound-aromatic vinyl compound copolymer, 0.1 to 10% by weight of a dialkyl phthalate compound and 0.1 to 10% by weight of a carboxy-reactive epoxy resin.

2. The composite resin-based composition according to claim 1, wherein the polyethylene terephthalate resin comprises 1 to 5% by weight of a crystallization rate reducing agent, based on a total weight of the polyethylene terephthalate resin including the crystallization rate reducing agent.

3. The composite resin-based composition according to claim 2, wherein the crystallization rate reducing agent is one or more selected from the group consisting of isophthalic acid, cyclohexylene dimethanol, diethylene glycol and neopentyl glycol.

4. The composite resin-based composition according to claim 1, wherein the polybutylene terephthalate resin has an intrinsic viscosity of 0.9 dl/g or more, and the polyethylene terephthalate resin has an intrinsic viscosity of 0.6 to 0.9 dl/g.

5. The composite resin-based composition according to claim 1, wherein the polycarbonate resin has a flow index (300° C., load: 1.2 kg) of 5 to 12 g/10 min.

6. The composite resin-based composition according to claim 1, wherein the polyorganosiloxane-polycarbonate resin comprises a diorganosiloxane-derived block in an amount of 5 to 30% by weight as calculated by a weight of diorganosiloxane compound, of the polyorganosiloxane-polycarbonate resin.

7. The composite resin-based composition according to claim 1, wherein the (meth)acrylate compound-conjugated diene compound-aromatic vinyl compound copolymer comprises 40 to 80% by weight of a conjugated diene compound, 10 to 40% by weight of an aromatic vinyl compound, and 1 to 20% by weight of a (meth)acrylate compound.

8. The composite resin-based composition according to claim 1, wherein a particle size of the (meth)acrylate compound-conjugated diene compound-aromatic vinyl compound copolymer is 0.2 to 0.4 μm.

9. The composite resin-based composition according to claim 1, wherein the dialkyl phthalate compound has an alkyl group having 5 to 8 carbon atoms.

10. The composite resin-based composition according to claim 1, wherein the carboxy-reactive epoxy resin is one or more selected from among an ethylene-n-butyl acrylate-glycidyl methacrylate copolymer, an ethylene-glycidyl methacrylate copolymer, an ethylene-acrylic ester-glycidyl methacrylate copolymer, an ethylene-methyl acrylate-glycidyl methacrylate copolymer, an ethylene-dimethacrylate-glycidyl methacrylate copolymer, an ethylene-acrylate-glycidyl methacrylate copolymer and an ethylene-vinyl acetate-glycidyl methacrylate copolymer.

11. The composite resin-based composition according to claim 1, wherein the carboxy-reactive epoxy resin comprises 1 to 15% by weight of a glycidyl methacrylate-derived unit.

12. The composite resin-based composition according to claim 1, wherein an intrinsic viscosity of the polybutylene terephthalate resin is higher than an intrinsic viscosity of the polyethylene terephthalate resin.

13. The composite resin-based composition according to claim 1, wherein the polyethylene terephthalate resin has a melting point of 252° C. or less.

14. The composite resin-based composition according to claim 1, wherein a high-load heat resistance, measured under 1.82 MPa according to ISO 75, of the composite resin composition is 92° C. or more.

15. The composite resin-based composition according to claim 1, wherein a hydrolysis-resistance retention rate, which is represented by Equation 1 below, of the composite resin composition is 79% or more:

$$\text{hydrolysis-resistance retention rate} = (\text{Izod impact strength after aging/Izod impact strength before aging}) \times 100 \quad \text{[Equation 1]}$$

where aging is performed for 168 hr in a chamber under conditions of 85° C. and 85%, and Izod impact strength is a notch impact strength measured at 23° C. according to ISO 180/1A.

16. A method of preparing a composite resin composition, the method comprising:
feeding a mixture into an extruder, the mixture comprising:
100 parts by weight of the composite resin comprising, based on 100% by weight of a total of the composite resin, 60 to 79% by weight of a polycarbonate resin, 20 to 30% by weight of a polybutylene terephthalate resin and 1 to 10% by weight of a polyethylene terephthalate resin; and
10 to 40 parts by weight of a hydrolysis stabilizer prepared by mixing, based on 100% by weight of a total of the hydrolysis stabilizer, 20 to 50% by weight of a polyorganosiloxane-polycarbonate resin, 48.5 to 65% by weight of a (meth)acrylate compound-conjugated diene compound-aromatic vinyl compound copolymer, 0.1 to 10% by weight of a dialkyl phthalate compound and 0.1 to 10% by weight of a carboxy-reactive epoxy resin, and
melt-kneading and extruding the mixture.

17. An automobile interior product manufactured using the composite resin-based composition according to claim 1.

18. The automobile interior product according to claim 17, wherein the automobile interior product comprises a floor console front tray, a cup holder, an inner garnish, a switch bezel, a cup holder housing, or an indicator panel.

* * * * *